H. B. Latham,
Horse Collar,
No. 8,856. Patented Apr. 6, 1852.
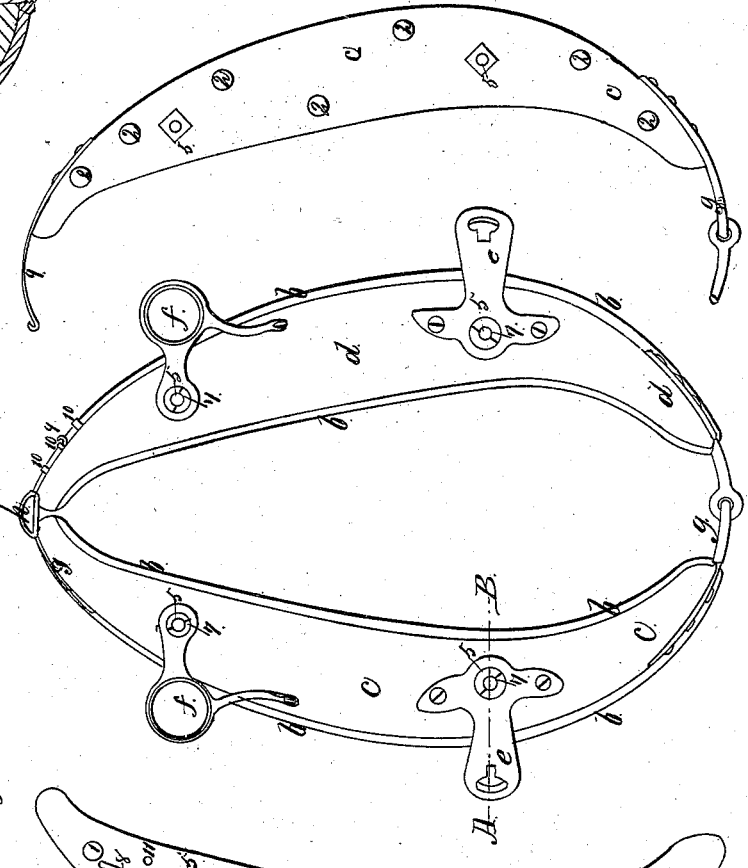

UNITED STATES PATENT OFFICE.

HENRY B. LATHAM, OF HUNTINGTON, NEW YORK.

HORSE-COLLAR.

Specification of Letters Patent No. 8,856, dated April 6, 1852.

*To all whom it may concern:*

Be it known that I, HENRY B. LATHAM, of Huntington, Suffolk county, State of New York, have invented and made certain new and useful Improvements in Collars and Hames for Horses and other Animals, the object being to facilitate the attachment of the parts of the collar together when being put onto the animal and to ventilate the collar to prevent its becoming heated; also means which allow the hame to move on the collar at the same time that it is securely attached thereto, so that any strain or lurching motion does not cause the collar to gall the animal by shifting; and I hereby declare that the following is a full, clear, and exact description of the construction and operation of the same, reference being had to the annexed drawing, making part of this specification, wherein—

Figure 1, is an elevation of the collar complete; Fig. 2, is an elevation of the half collar on the off side, the collar on the nigh side being the same, but handed, Fig. 3, is an elevation of the off side hame shown on the side next the collar; Fig. 4, is a section in larger size through the line A, B, Fig. 1, showing the manner in which the collar and hame are connected.

The like marks of reference denote the same parts in each figure.

$a$, is the body or frame of the collar receiving the padding and covering $b$. On the flat side of the collar $a$, opposite to where it sets on the horse I place rivets 1, with large flat heads that rise slightly from the collar and into the flat side of the off side hame $c$, and nigh side hame $d$, I place rivets 2, corresponding in position to the rivets 1, so that when the collar and hames are placed together the heads of the rivets come onto each other. These rivets take the strain and pressure between the collar and hame and the heads will slide on each other and relieve any jerking or lurching motion of the parts of the harness and prevent the collar slipping or moving on the animal. To effect this and allow this motion and at the same time make a permanent attachment between the hame and collar I employ the following means: I countersink a metal plate, $x$, see Fig. 4, into the body $a$, of the collar over which I place a plate 3, so as to allow a small space or recess between these plates $x$, and 3; the plate 3, has a large hole in the center of it through which is entered a bolt 5, before the plate 3, is attached to the collar $a$; this bolt 5, has a large flat head 4, larger than the hole in the plate 3. It will now be seen that the bolt 5, can slide or move laterally at the same time that it is retained in place, the head sliding between the plates $x$ and 3. On the bolt 5, is a square 6, that enters into a countersink in the hame, to prevent the bolt from turning; the bolt 5, passing through the hame is secured by a nut 7. By reference to Figs. 1, 2 and 3, it will be seen that there are four of these sliding bolts, two on each side connecting the upper and lower ends of the hames and collars, and also that the nuts 7 secure the draft eyes $e$, and territs $f$, for the reins as usual.

The lower ends of the off hame $c$, and nigh hame $d$, are connected together by a link $g$, similar to the link or joint in the bit of horses; so that the hames and collar can be opened, to put in place on the animal, and this connection allows the sides of the collar to take a proper bearing on the animal's neck. The tops of the hames are to be connected by means of a spring 9, one end of which is attached to the off side hame, the other end terminates as a hooked lip, which when securing the collar in place is to be passed into and under loops or staples 10 in the upper end of the nigh side hame; the point of the spring hooking behind the staple at the required point secures the hames together and at the same time furnishes an easy means for detaching when required; $h$, is a cap on the spring 9, to serve as an ornament and cover the joint of the collar and hames at their upper ends.

Through the body $a$ of the collar I bore holes 11, in different places so as to allow the springing of the padding $b$, to expel and draw in air as the animal moves so as to ventilate the collar and keep it cool. These holes are shown in Fig. 2.

8, 8, Fig. 2, represents bow springs which may be attached to the collar or to the hames so as to make a yielding or elastic bearing between the hame and collar, these springs may in some cases be dispensed with without injuring the effectiveness of the collar.

It will be seen that the rivets 1 and 2, and bolts 5, may be used between the saddle board and saddle pad, in saddles used with draft horses allowing of the same easing motion and producing the same beneficial effects as with the collar. And also that the air holes 11, may be used in the saddle pad for the same purposes as in the collar.

My improvements in the means of attaching the hame and collar prevent the hame from slipping and becoming disengaged from the collar as is sometimes the case. At the same time this collar is light, durable and corforms readily to the animal that wears it.

What I desire to recure by Letters Patent is—

1. I claim the spring 9, and staples 10, to connect the upper ends of the hames as described and shown.

2. I claim so constructing and fitting the collar and hame that the hame shall work or slide on the collar by any jerk or lurching of the harness, for the purpose of relieving the animal, said collar and hame being fitted with the rivets 1 and 2, or their equivalents to allow the one to slide on the other, and being connected by the bolts 5, or their equivalents as described and shown.

In witness whereof I have hereunto set my signature this first day of March one thousand eight hundred and fifty-two.

HENRY B. LATHAM.

Witnesses:
ZOPHAR KETCHAM,
I. R. ROLPH.